United States Patent
Chan et al.

(10) Patent No.: US 6,799,718 B2
(45) Date of Patent: Oct. 5, 2004

(54) DEVELOPMENT ASSISTANCE FOR MIXED-LANGUAGE SOURCES

(75) Inventors: Ken Chan, Scotts Valley, CA (US); Hin Boen, Santa Cruz, CA (US); Peter Johnson, Santa Cruz, CA (US); Campegius L. Bronkhorst, Santa Cruz, CA (US)

(73) Assignee: Borland Software Corp., Scotts Valley, CA (US)

(*) Notice: Subject to any disclaimer, the term of this patent is extended or adjusted under 35 U.S.C. 154(b) by 50 days.

(21) Appl. No.: 10/193,647

(22) Filed: Jul. 10, 2002

(65) Prior Publication Data

US 2003/0028364 A1 Feb. 6, 2003

Related U.S. Application Data

(60) Provisional application No. 60/304,515, filed on Jul. 10, 2001.

(51) Int. Cl.[7] .............................................. G06F 17/00
(52) U.S. Cl. ..................... 235/375; 235/376; 235/436; 235/438; 235/494; 235/495; 717/136; 717/137; 717/141
(58) Field of Search ................................ 235/375, 376, 235/436, 438, 494, 495; 717/136, 137, 141, 100, 114, 143

(56) References Cited

U.S. PATENT DOCUMENTS

| | | | | |
|---|---|---|---|---|
| 4,931,928 A | * | 6/1990 | Greenfeld | 717/131 |
| 5,204,663 A | * | 4/1993 | Lee | 340/5.28 |
| 5,361,351 A | * | 11/1994 | Lenkov et al. | 717/124 |
| 6,204,782 B1 | * | 3/2001 | Gonzalez et al. | 341/90 |
| 6,325,283 B1 | * | 12/2001 | Chu et al. | 235/375 |
| 6,353,923 B1 | * | 3/2002 | Bogle et al. | 717/128 |
| 6,425,118 B1 | * | 7/2002 | Molloy et al. | 717/136 |
| 6,553,363 B1 | * | 4/2003 | Hoffman | 707/1 |
| 6,574,792 B1 | * | 6/2003 | Easton | 717/142 |

* cited by examiner

*Primary Examiner*—Michael G. Lee
*Assistant Examiner*—Steven S. Paik
(74) *Attorney, Agent, or Firm*—Darby & Darby

(57) ABSTRACT

Development assistance for a program comprising code in more than one language, is provided appropriately for each language in an integrated development environment. The assistance can include syntax highlighting, structure analysis, error reporting, completion assistance and/or context-sensitive help. The language of the subject element of code is determined and the appropriate assistance processes are applied. If the code is in a supplementary language, routines associated with the supplementary language are invoked to provide the assistance. When needed, information from other parts of the program file is provided to determine the appropriate assistance for the element of code.

38 Claims, 6 Drawing Sheets

(2 of 6 Drawing Sheet(s) Filed in Color)

DEVELOPMENT ASSISTANCE FOR MIXED-LANGUAGE SOURCES

This application claims the priority of U.S. Provisional Application Ser. No. 60/304,515, filed Jul. 10, 2001 which is hereby incorporated hereby by reference in its entirety.

BACKGROUND OF THE INVENTION

This invention relates to computer programs for the development of other programs and, more particularly, to computer programs which provide Integrated Development Environments.

An Integrated Development Environment (IDE) is an application or set of program modules run from a single user interface which provides an environment for the development of application programs in particular computer languages. IDEs typically provide development assistance for the language or languages the IDE supports. These languages include both programming languages such as Pascal and Java, and markup languages like HTML or XML. Development assistance includes features such as syntax highlighting, structure analysis, error reporting, completion assistance and context-sensitive help. An example of an IDE is the JBuilder product made by Borland Software Corporation of Scotts Valley, Calif.

Syntax highlighting is a feature by which different elements of the language grammar, such as reserved words, symbols, literal values, and comments, are displayed with different colors and/or attributes to make them more easily distinguished. Structure analysis and error reporting features provide information as the program is developed, such as a separate tree/outline of the file contents, and visual indications of whether the syntax of the file is valid. For example, an outline for a Java source file could show an alphabetized list of all the program object methods and fields in an object class that can be used to immediately navigate to that element in the file. This feature can also show syntax errors, such as missing statement terminators (e.g., semicolons), mismatched parentheses or braces, and invalid keyword combinations. Such information is tied to a particular position in the file whenever possible, so that the user can immediately locate that element of code or error.

Another typical IDE feature is completion assistance. When this feature is present, the IDE suggests valid names for program classes, elements, methods, variables, attributes and the like for the current position in the source code, usually in a popup list. It may also describe the available choices to some degree, obviating the need to consult other documentation or references. Optionally the completion assistance may automatically insert text into the source file, such as the second of a set of paired symbols when the first is typed by the user, or the rest of a name when there is only one valid name that starts with what the user has already typed.

IDEs also often provide context-sensitive help. In particular, when help is requested, the help that is provided relates to the code at that location of the cursor, e.g., present the definition of a command or required parameters. This help also displays available documentation for the current element in the source file, e.g., keyword, symbol, class, method, or field, etc.

The idea of having more than one language in a single source file is not new (such as embedding SQL in C files). In fact, the practice has become widespread with the desire to provide dynamic content for the Internet. To this end, many programming languages are being combined with markup languages in a single file to form hybrid-language files. However, these new hybrid files are no longer valid instances of their constituent languages. For example, Java Server Pages (JSPs), which can be created by JBuilder, embeds Java code inside a template, which is usually a markup language, most commonly HTML. The HTML portion could also contain embedded code in JavaScript and/or VBScript, so a JSP could easily contain three or four different languages. Such files are not intended to be directly displayed as HTML, nor are they valid Java source files that can be compiled as-is.

In addition, these hybrid file formats often introduce some syntax or language of their own in order to delineate the other constituent languages, and/or to provide features. These features may be used to bridge those languages or to provide entirely new functionality for the hybrid file format. For example, JSPs specify syntax to differentiate between Java expressions, statements, and declarations; add imports; declare JavaBeans; and declare pages to handle errors.

Because an IDE knows (or can be told) the syntax and languages that comprise the hybrid file, the "problem" is to provide the same forms of development assistance that are typical for those languages, both separately and in concert. Complete development assistance therefore requires not only solving the general problem of multiple languages in the same file, but any inter-language issues. For example, while the kind of completion assistance may remain specific to the language at the current position in file, the suggestion of valid names may be affected by other sections of the file that are in a different language. An instance of this example is the use of JSP-specific syntax to declare Java imports. In this case, a JSP-to-Java converter in the IDE handles the embedded code by recognizing the JSP syntax (<% @page import="some.package.or.class" % >) and converts it to the Java equivalent (import some.package.or.class;).

IDEs known in the prior art do not provide comprehensive development assistance for mixed-language sources. In most hybrid file formats, one of the languages is dominant. Therefore, the IDE treats the hybrid as that dominant type, providing assistance for that language, with little or no help for the other language(s). For example, a JSP can be considered mostly HTML with Java embedded in it. An IDE would then provide the usual HTML assistance features, while treating the embedded Java as simple text, with no assistance for it.

Thus, it would be advantageous if there were a way to provide development assistance for all of the languages used in a hybrid or mixed language file developed in an IDE.

SUMMARY OF THE INVENTION

The present invention is directed to providing development assistance for multiple languages in an Integrated Development Environment (IDE). In particular, the present invention provides a system by which development assistance, such as syntax highlighting, structure analysis, error reporting, completion assistance and context-sensitive help, is provided appropriately for each language in hybrid files developed in the IDE. This makes the problem of developing such mixed language programs much easier, since all of the development assistance typically available in an IDE for a single language is made available for all or any of the languages used in the IDE.

In an illustrative embodiment of the invention, the existing components that provide development assistance features for each constituent language are used to provide assistance for these languages in a mixed language file.

Selective components which provide the assistance in a single languages are enhanced so that they can inter-operate on a mixed-language source file. The nature of the enhancement varies with the type of assistance. In particular, the mixed-language file M may contain the languages L1 (e.g., HTML), L2 (e.g., Java), L3 (e.g., JavaScript), and so forth, in addition to any M-specific syntax; where L1 is the dominant language. For example, M may be a JSP file that uses these languages and is created in JBuilder. M type refers to the file format defined in the specification for M-syntax or general file type as indicated by the extension in a filename. The specification for M-syntax includes a framework for the multiple-language file.

Syntax assistance is typically provided for individual languages by scanner programs S that identify the syntax of the code as it is being written. The scanner looks for characteristic symbols and keywords, and their relative position in the text, to identify elements, determine the syntax, and highlight the code-element according to a predetermined style. To implement this in a mixed language file, the scanners S1, S2, S3 for each language are enabled. However, at least one of the scanners, e.g., S1 for the dominant language, is modified to recognize the additional mixed or M-specific syntax and, if necessary, identify the presence of other constituent language(s). The enhanced scanner is thus adapted for the primary language. However, the scanner need not understand these languages, since the other scanners are activated for that purpose.

Structure analysis and error reporting can be implemented using existing parser programs P for the constituent languages. The concept is to apply the appropriate parser for each section of code depending on the language of the code. The parser for the dominant language may be enhanced to recognize the M-syntax as well as the subject language. However, some sections of code in some languages do not constitute self-contained code in their language which is amenable to parsing, even though the code may be valid in context within the M file. Therefore, applying the corresponding parser for a language to the section of code as it appears in M would result in an inflated number of errors. Instead of parsing the section of code out of context, the section of code may be converted to self-contained code using the framework provided by the specifications for M and the corresponding parser may be applied to the converted code. In this way only genuine errors in the file are detected and the structure is more accurately determined by the parser. Thus, converters are provided for those constituent languages susceptible to misinterpretation by the parser. Upon application of the converter to a section of code, revised code is produced and stored in a buffer on which the corresponding parser may operate. For any constituent language which does not pose complications to the parser when removed from its context in M, an accumulator may be applied to collect the sections of code for that language in a single buffer or file. The conversion or accumulation processes may be performed prior to applying the parsers. The enhanced parser for the dominant language operates on the sections of code in the dominant language or the M language, but substantially ignores the code in other languages which are processed by the other parsers. However, the results of all the processors are organized and presented to the user/programmer according to the original mixed language file M.

Completion assistance is a further type of development assistance that can be incorporated into an existing IDE to provide enhanced mixed language functionality. In a standard IDE there is a framework for various completion engines E, and a common mechanism for invoking them. Either the engine causes automatic completion of the source code generation or it displays a user interface that contains suggestions for completion. Each of the languages L1, L2, L3 has a completion engine E1, E2, E3, respectively, that operates upon the buffer that represents the file for which completion help is requested, based on an indicated position in that buffer. Optionally, access is provided to the source code used as the basis for files generated by converters (e.g. Java base classes used in JSP implementation classes) that contain useful information like formal parameter names for methods to assist in the completion of the source code. When access to the source code is not available, generic parameter names may be used, e.g., p1, p2, etc. An aspect of the proponent invention is to tie in those JSP implementation class sources with the code generated by the converter to provide better information.

To implement completion assistance, the various completion engines are modified to recognize M as an additional potential file type for their language. If the engine is invoked for an instance of M, and a converter C or accumulator A is used for that constituent language, then the converter/accumulator is invoked so that code in that language is stored in a new buffer. That buffer's contents are substituted for the original content of M. The position in the buffer passed to the engine must also be modified using the recorded position mappings. If a converter uses source code that is available, it automatically informs the engine of that source code, so that the engine may present information contained therein.

If an IDE uses the completion assistance and/or structure analysis functionality of the present invention to identify the element for which help is requested, the enhancements applied to those subsystems enable help for M, requiring only that M be added as a valid type for this feature. Thus, help can be language specific, even for a mixed language file.

BRIEF DESCRIPTION OF THE DRAWINGS

The patent or application file contains at least one drawing executed in color. Copies of this patent or patent application publication with color drawings will be provided by the office upon request and payment of the necessary fee.

The foregoing and other features of the present invention will be more readily apparent from the following detailed description and drawings of illustrative embodiments of the invention in which.

DETAILED DESCRIPTION OF EXEMPLARY EMBODIMENTS

In the embodiments presented here, existing development assistance components are utilized wherever possible. Some of these components must be enhanced so that they can inter-operate on a mixed-language source file. The nature of the enhancement varies with the type of assistance. In these descriptions, the mixed-language file/type M may contain the languages L1, L2, L3, and so forth, in addition to any M-specific syntax; where L1 is the dominant language. For example, a JSP could contain HTML, Java, and JavaScript. The term primary language is used to refer to the dominant language alone, the M-specific syntax alone, or combination of the dominant language and M-specific syntax. The dominant language is the language of the code operative when the program is executed. The dominant language may or may not constitute a substantial amount of code relative to the mixed-language file. The term supplementary language is used to refer to one or more constituent languages that are present in the file and/or those constituent languages that the integrated development environment supports.

Figure 1:
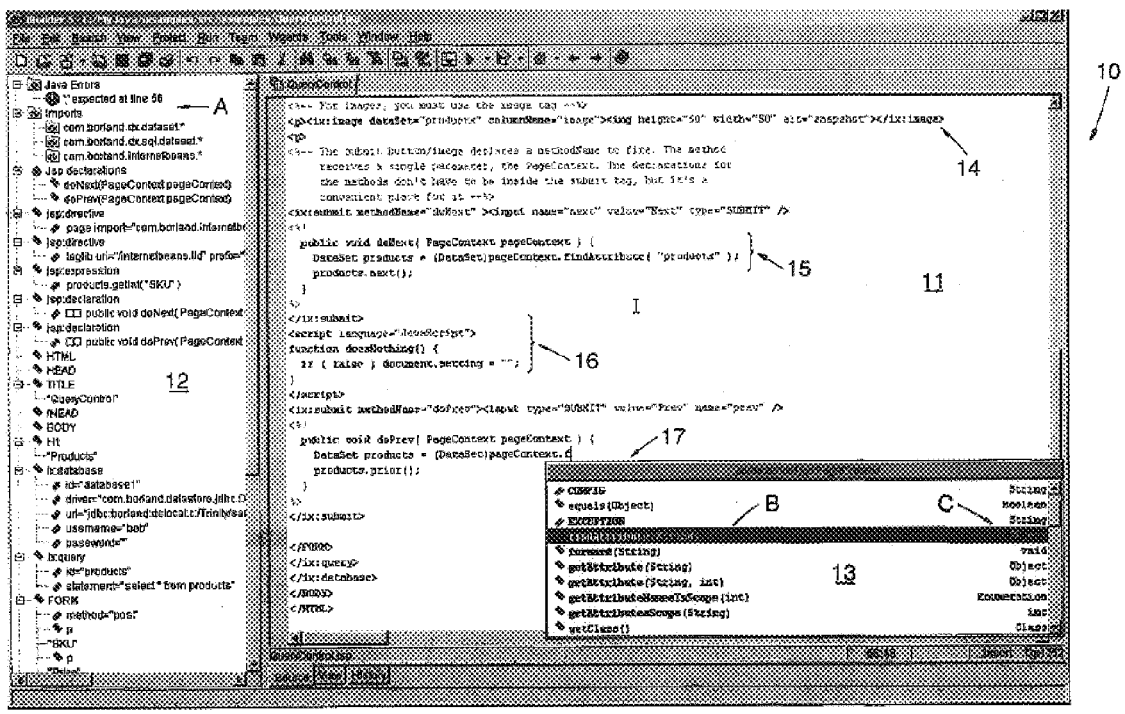
FIG. 1 is an illustration of a screen from an exemplary IDE, e.g., JBuilder, enhanced to provide multi-language syntax highlighting, structure analysis, error reporting, and completion assistance according to an embodiment of the present invention.
Figure 2:
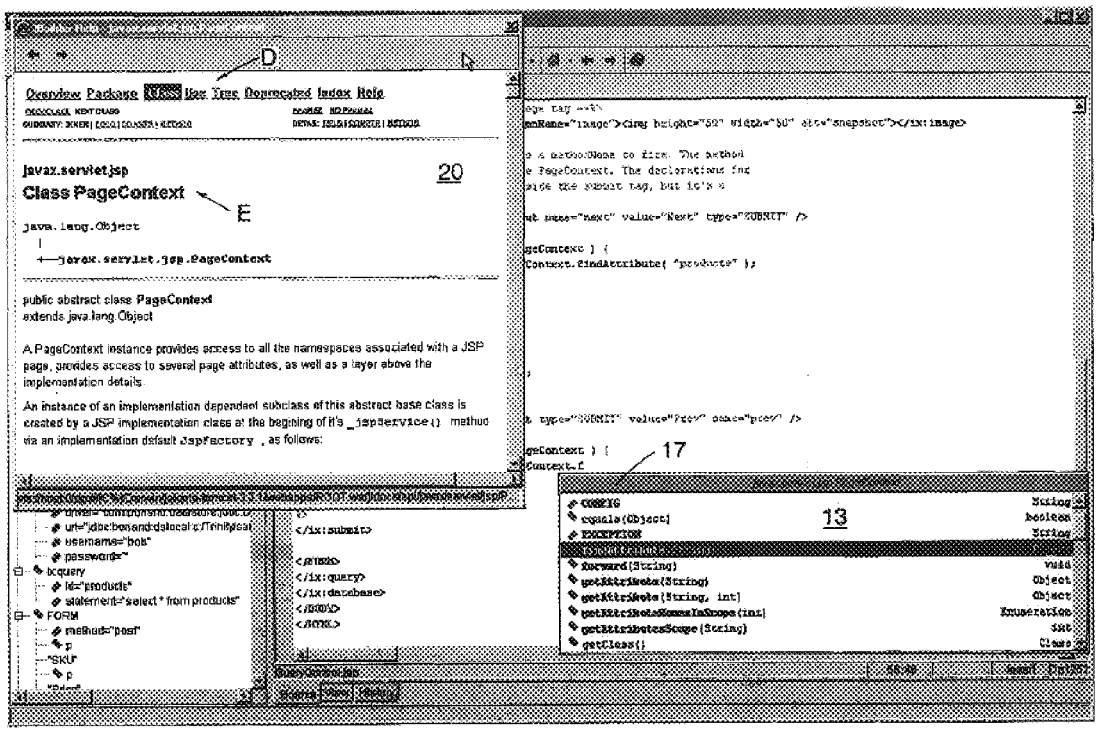
FIG. 2 is an illustration of a screen from an exemplary IDE, e.g., JBuilder, enhanced to provide multi-language context-sensitive help according to an embodiment of present invention.

In the following illustrative embodiment, the features of development assistance provided in the IDE include: syntax highlighting, structure analysis, error reporting, completion assistance, and context-sensitive help. Referring to FIGS. 1 and 2, the IDE is a graphical user interface 10 on a Windows platform in which the subject file M is being developed. The code being developed in M is illustrated in a text editor window 11, in which syntax highlighting is visible. Structure analysis and error reporting are illustrated in window 12. The completion assistance feature is illustrated in window 13 and the context-sensitive help feature is illustrated in window 20 of FIG. 2.

For each type of development assistance, the amount of code considered or processed in a unit varies. For example, a scanner may examine each word or symbol separately, while a parser may treat a statement, routine, or object as a unit. The terms code element and section of code are used to reflect that the variance in a unit of code.

The IDE uses a set of generic style rules to determine the syntax highlighting for all the supported languages or file types. In particular, existing scanners are used to look for symbols and keywords and their relative positions identifying code-elements. The code-elements for each language are used in order to apply the generic style rules. Thus, at any position in the multi-language file M, the style may be determined by examining the syntax-identification information provided by the appropriate scanner and the style rules.

In one embodiment, the scanner for the dominant language is enhanced to recognize the syntax for the mixed-language file M and, if necessary, to recognize the presence of other languages. The modified scanner identifies pre-defined sequences or symbols (markers) which indicate the presence of source code in a language other than the dominant language. Optionally, the markers may identify the language being used in the subject code. When markers are not employed, at least one scanner is modified to recognize the constituent languages directly.

Referring to FIG. 1, the various syntax is indicated using the different colors. In the HTML code indicated at 14, the tags <p> and <img> are one color; the attributes height and width are displayed in another color; and the values of those attributes "products" and "image" in yet another color. The coloring scheme is provided by the IDE based on the identification information provided by the HTML scanner with respect to the section of code. In the Java code indicated at 15, the color scheme is consistent with the generic styling applied to the results of the Java scanner with respect to this section of code. The Java code is surrounded by M-syntax or JSP-syntax markers <%! and %>. Javascript code, indicated at 16, is surrounded by HTML tags identifying the language, <script language="javascript"> and </script> respectively. These tags are used for embedding scripts and are recognized by the HTML scanner.

The scanners typically operate directly on the source-code file M. The IDE tracks the presence of code in the various languages by using offset positions. As the code is scanned by the enhanced scanner for the dominant language S1, each section of code in another language is identified by its relative position. The position data is provided to the appropriate scanner which then operates on the corresponding section in the file M. The offset positions identifying the sections of code in the various languages may be stored in a buffer or file for easy reference. Alternatively, portions of code may be copied to separate files or buffers which are then provided to the appropriate scanner and other modules suited for the particular language. The scanners operate in a conventional manner, e.g, periodically or on a keystroke basis.

Figure 3:
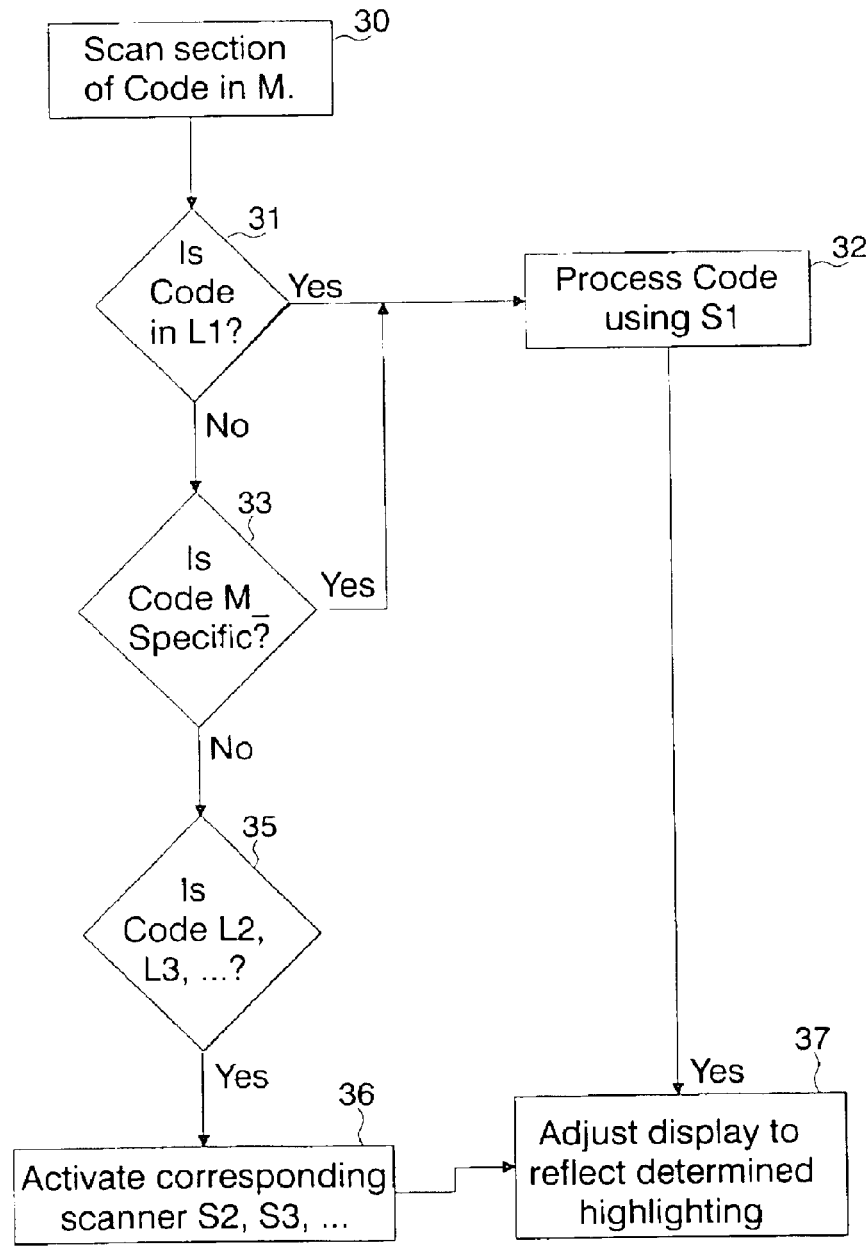
FIG. 3 is a flow chart showing the process for providing syntax highlighting according to an embodiment of the present invention.

Referring to FIG. 3, there is shown a process for providing syntax highlighting according an embodiment of the present invention. At step 30, S1 scans of the code in M typically reading character-by-character, forming tokens of text, such as a word or phrase. At step 31, S1 determines whether the word or phrase is in the dominant language. If it is, then at step 32, SI processes the word or phrase according to its normal operation, determining the symbol and keywords and applying the style rules for that symbol or keyword. At step 33, S1 determines whether the symbol or keyword constitutes M-specific syntax. If it is, then at step 32, S1 processes the symbol or keyword since S1 has been modified to recognize M syntax. If at step 33, it is determined that the symbol or keyword if not in the M-specific syntax, then at step 35, it is determined whether the symbol or keyword is in another language, L2, L3, etc., then at step 36, the appropriate scanner S2, S3, etc., is activated to continue scanning the code until a there is another change in language. S1 provides the activated scanner with the offset position identifying the start of code in the other language. Alternatively, S1 continues scanning the code in M to determine the next change in language. Then the appropriate scanner is activated to process the section of code identified by the start and end positions determined by S1.

At step 37, the IDE uses the identification information from the scanners in conjunction with the generic style rules to determine the appropriate highlighting for the code element and adjusts the display of each word or phrase accordingly. The order of the determination steps may vary and processing may occur in parallel or sequence. The style information may be stored in a separate file or buffer which the IDE may use to adjust the display.

In a further embodiment, instead of modifying the scanner for the dominant language, a separate higher level scanner is provided for the purpose of recognizing the markers or M-syntax that identify the various constituent languages. Thus, the IDE uses the high level scanner first to identify the sections of code and then applies the appropriate existing scanners for the various sections according to the languages. As a further alternative, modifications may be made to each scanner being used. In such an embodiment, when a scanner encounters code of another language, the appropriate scanner for the new language is invoked for scanning that portion. In contrast, where only S1 is modified, it operates to scan code in the dominant language as well as to delegate to the appropriate unmodified scanner the task of scanning sections of code in the constituent languages. In still another embodiment the scanner for the dominant language may be able to recognize the actual code of the other languages directly, rather than rely on any markers or M-syntax to invoke other scanners.

The IDE uses parsers to provide structure analysis and error reporting features. Existing parsers for each language may be used. However, to achieve the functionality when applied to mixed-language files, the parser for the dominant language P1 may be modified to recognize the M-specific syntax and the presence of other languages.

Operating cooperatively to process the code in the multiple-language file M, the parsers determine the structure of the program code and any syntactical errors that exist. The IDE has a mechanism for displaying the structure and reporting the errors determined by the parsers. As illustrated in window 12 of FIG. 1, the structural analysis is graphically presented in outline format. The IDE displays any errors detected by any of the parsers along with the location in M, e.g., line and/or column number in M. For example, an error is indicated at reference A in window 12 stating that a semicolon is expected at line 56 in the text editor window 11 (see reference number 17). The current position of the cursor is also shown in the screen shot in FIG. 1 at the bottom right corner. The parsing may be performed periodically, on demand, or triggered by some action or event.

Where the code consists of various languages, some of the sections of code may not by themselves constitute valid code when removed from their context in M, but rather require support from code in another part of M or a file external to M. For example, a single statement in Javascript is self-contained and valid. However, a single statement in Java cannot stand alone; due to the nature the language. Thus, a Java statement must be contained in a method in a class. A converter operates to translate the statement into valid and complete source code element. The converter need not be dedicated to a single specific language, one converter may be applied for various similar languages. The code in the dominant language typically does not require conversion because it represents a valid program. Furthermore, code in the other constituent languages that do not require conversion may occur in numerous locations, and may impose complications for the corresponding parsers. An accumulator operates to collect in a separate location (e.g., file or buffer) the code for each constituent language that does not require conversion.

Figure 4:
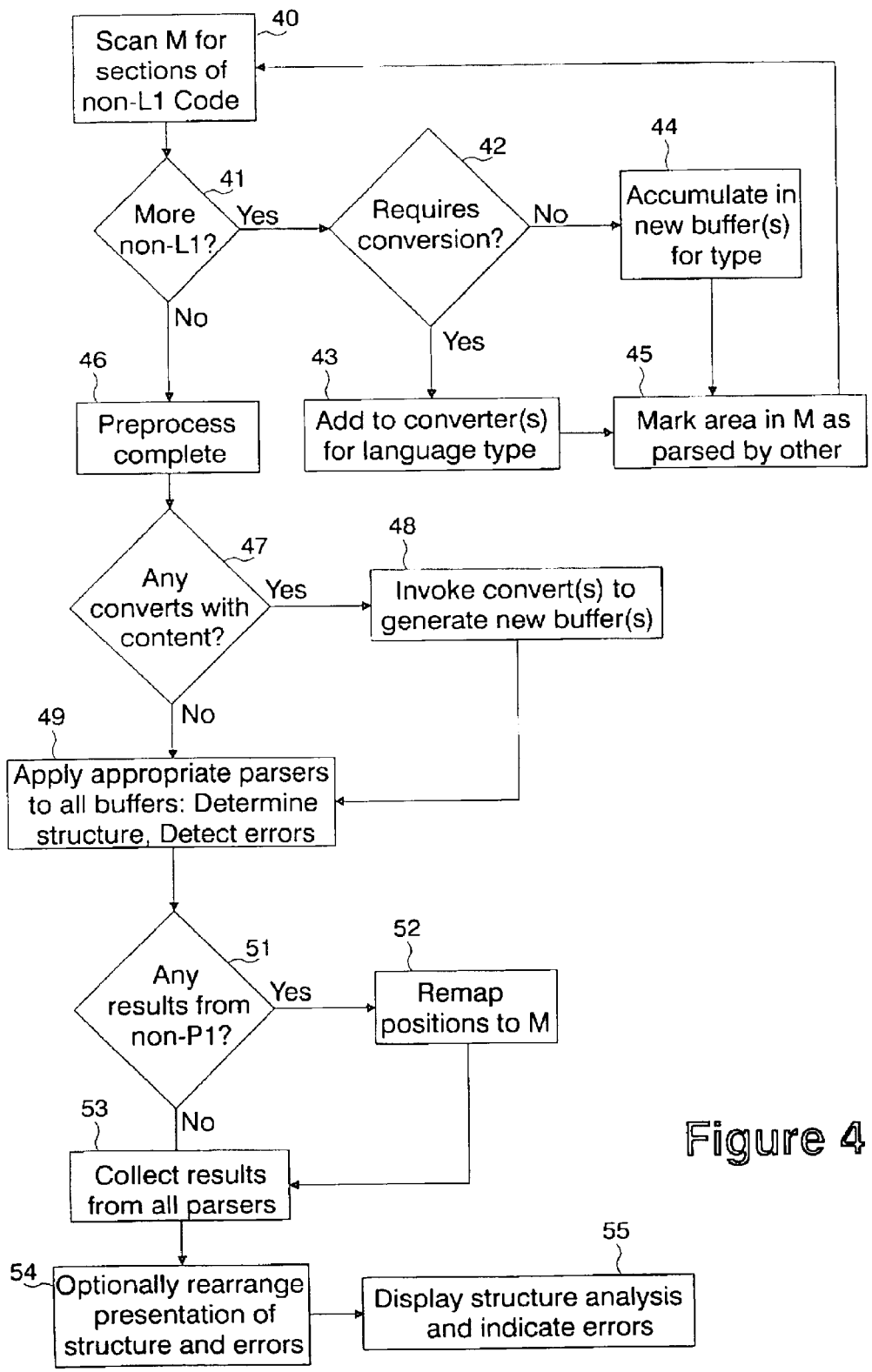
FIG. 4 is a flow chart showing the process for providing structure analysis and error reporting according to an embodiment of the present invention.

Hence, in a preprocessing stage, the code sections in the constituent languages other than the dominant language, are processed by a converter or accumulator to prepare the code for the parsers. A separate preprocessing pass may be performed for each constituent language. Referring to FIG. 4, at steps 40 through 46, the enhanced parser P1 performs the preprocessing. Alternatively a separate parser may perform the preprocessing steps. However, it is advantageous from a speed and memory usage standpoint for P1 to do the preprocessing because it avoids conversion/accumulation and position mapping for the dominant language. This, however, depends on nature of the relationship between L1 and M. In this example, the parser for the dominant language is most suitable because of the relationship between the languages HTML and JSP, i.e., in JSP sections can be marked off as empty HTML tagged areas.

During preprocessing, at step 40, parser P1 scans the M file to find code in a non-dominant (non-L1) language. The determination of a non-L1 language is made in step 41. Then at step 42, P1 determines whether the code requires conversion. Specifically, the enhanced dominant parser P1 is capable of identifying the constituent languages, typically by recognizing select markers. Whether a language requires conversion is predetermined a priori and included in the enhancement of the dominant parser. If the language requires conversion, at step 43, P1 indicates that the section of code be designated for the appropriate converter for the language. If the code does not require conversion, at step 44, the section of code is provided to the appropriate accumulator to be placed in a buffer for code of the same language. At step 45, the M file is marked to indicate the section of code converted or accumulated. Then the process returns to step 40 and the scanning continues. At step 41, P1 determines whether there is more code in a non-dominant language. If there is, steps 42–45 are repeated. When all the sections of code in any non-dominant language are identified, the process proceeds from step 41 to 46 and preprocessing is complete. The converters and accumulators maintain records of the original locations of the code in M to enable mapping between the M file and buffers or working files.

Alternatively a separate preprocessing pass may be performed for each constituent language. More generally the order of processing within and among the methods described thus far and herein may vary without detracting from the effectiveness of the present invention.

After preprocessing, the parsers may perform structure and error analysis. At step 47, P1 determines whether any sections of code were designated for conversion by checking to see if there are any converters with content designated at step 43. If so, at step 48, the appropriate converter(s) are invoked and the converted code is generated in a separate buffer for each language. At step 49, the buffers with the code from the converters and accumulators are provided to the appropriate parsers according to the languages. This follows directly from step 47 if there was no conversion or from step 48 if there was. During the parsing step, the structure of those sections of the code are determined and any detected errors are noted. The enhanced P1 detects structure and errors in file M in the sections of code in the dominant language, ignoring code in any non-dominant language. The other parsers operate on the buffers or working files containing code in a single language. For the code in any non-dominant language as determined at step 51 (having been parsed in a buffer separate from the file M), the structure analysis and error information are then mapped at step 52 to the corresponding positions in the M file. At step 53, the parsing results are collected from the various parsers. At step 54, optionally the structure analysis and/or error information is rearranged for integrated presentation. At step 55, the structure analysis and any errors detected are presented to the user/programmer. The structure of the code is displayed in a uniform manner regardless of the change in languages. The errors are also indicated in the display with reference to locations in th M file.

Figure 5:
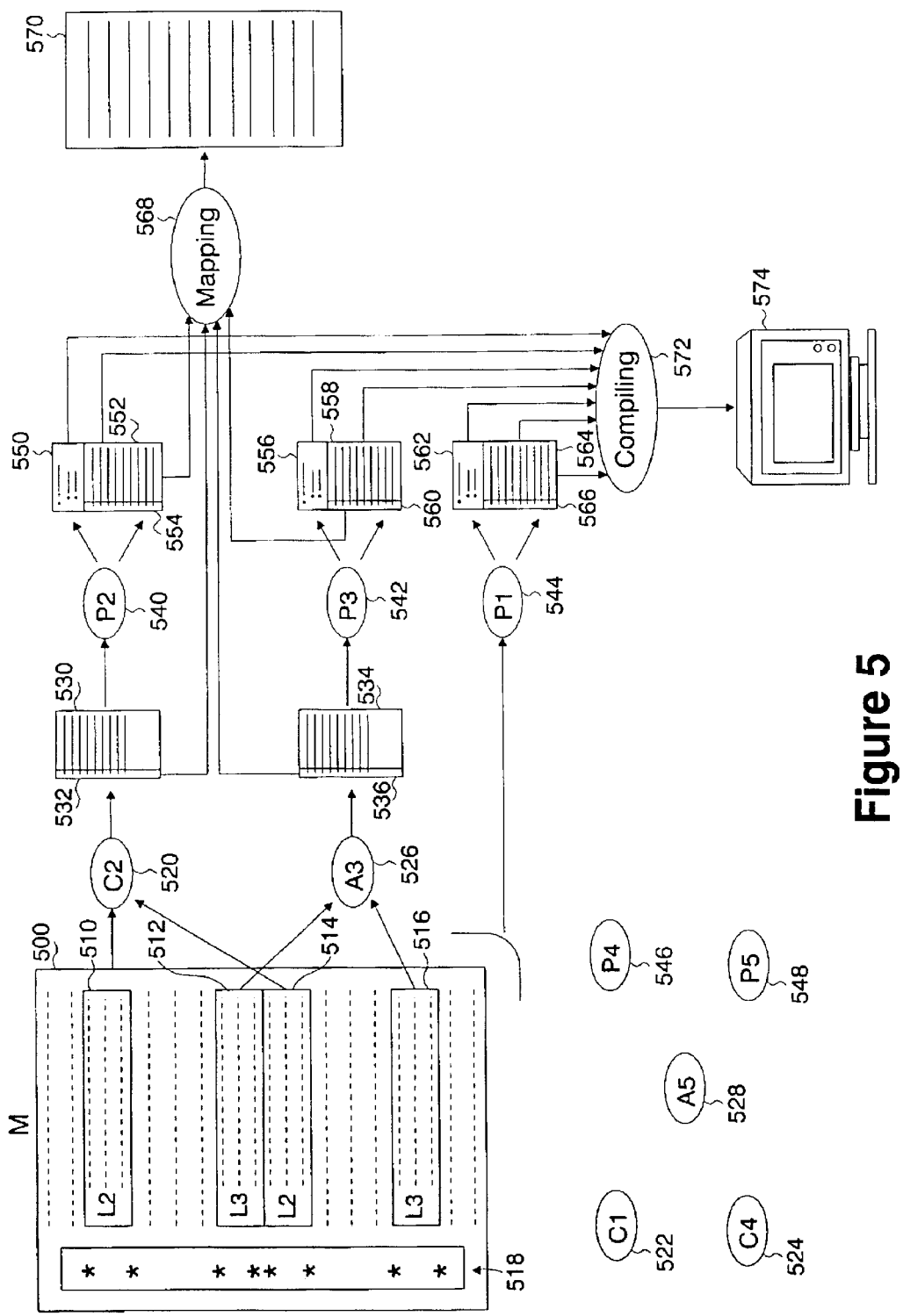
FIG. 5 is a block diagram showing the data and processes involved in structure analysis and error reporting according to an embodiment of the present invention.

An abstracted representation of the sample file M and processing thereof is depicted in FIG. 5. The format for file M 500 conforms to language L1 and includes some M-syntax. File M also contains sections of code in other languages L2 and L3 at various positions 510, 512, 514, and 516, within file M. The processes are represented by ovals but do not necessarily represent individual modules or programs. (For example, mapping 568 may be performed by the IDE, the dominant parser, or some other component.) During preprocessing, the sections of code in the various languages are identified and markings 518 may be included directly in file M or a supplemental file or buffer to identify boundaries between languages. In this example, only L2 code requires conversion. Hence, the sections of code in L2, 510 and 514, are provided to the converter 520 for the L2 language. The converter converts the code to the appropriate language using a buffer or file 530 and keeps a record of the corresponding positions in the file M. The mapping 532 may be stored with the converted code 530 or separately. The sections, 512, and 516, of code in L3 (which do not require conversion) are provided to the appropriate accumulator 526 for the L3 language. The L3 code from file M is transferred to a buffer or file 534 and the mapping information is maintained at 536.

The code for each language is parsed separately. L2 code, which was converted and stored in file 530, is parsed by the appropriate parser P2 (540). The parser 540 produces structure analysis 550 and error information 552 which may be stored together or separately. At least error location information 554 is maintained while parsing. L3 code is parsed by the appropriate parser P3 (542) and the structure and error information 556 and 558 is stored along with mapping information at 560. L1 code is parsed directly from file M by the appropriate parser P1 (544). Any M-specific code is parsed along with L1 code. The structure of the code 562 is determined and any detected errors 564 are noted along with location information 566. To prepare the structure analysis and error information for display presentation, the parsing results must be mapped back to the file M for providing meaningful reference to the source code of the program being developed. Mapping 568 uses the mapping information 532 and 536 produced by the converters and accumulators to translate the relative error locations 554 and 560 to the corresponding positions 570 in file M. The structure analysis 550, 556, 562 from each of the parsers is compiled at 572 and displayed at 574. The errors 552, 558, and 564 detected by each parser are compiled at 572 to generate the display at 574. The error locations 570 and 566 are used to cross reference or link the errors detected to the code being developed.

The logistics of tracking the sections of code for the various languages are a matter of mapping. The converters place the converted code into buffers. The accumulators also use buffers. Thus, the parsers are applied to buffers, and not to the main file M. Furthermore, the structure and error information generated by the parsers, relate the locations in the corresponding buffer and not the locations in M. However, the accumulators and converters generate mapping information for each unit of code stored in the buffers. So, the structure analysis and error processing modules of the IDE use the mapping information provided by the converters and accumulators to translate the location of each error message from the local buffer location to the location in M.

In another embodiment, a separate scanner may be used to identify the different languages. This scanner then directs the transmission of code for each constituent language to the respective accumulator or converter. The structure and error information produced by the parsers, including the parser for the dominant language P1, is translated to relate to the positions in M.

The structure analysis determined by the parsers may be presented in various formats. One format for structure information employed by IDEs (including JBuilder) is a tree or outline format. For example, the structure tree for a Java class that contains an inner class may look like this:

SomeClass
    InnerClass
        innerClassMethod( )
        anotherInnerClassMethod( )
        fieldValue
    SomeClass
    SomeClass(String)
    getSomething( )
    putSomething(String)
    differentFieldValue
    anotherFieldValue The main class (SomeClass) has one inner class, two constructors (one with no parameters, and one with a string parameter), two methods, and two fields. The inner class which has no explicit constructor, contains two methods and one field. A tree displayed in an IDE interface may use icons to differentiate between these kinds of elements.

For Java content in a JSP, which must be converted into a valid Java class prior to parsing, the resulting structure for such a generated class would have similar information. For the JSP shown in FIG. 1, which contains declarations for the methods doPrev and doNext, the resulting Java class would at a minimum have a structure as follows:

GeneratedJavaForJsp
    _jspservice( )
    doNext( )
    doPrev( )

where GeneratedJavaForJsp is an arbitrarily chosen class name; _jspservice is the standard method into which Java statements and expressions typed into the JSP would be executed (which therefore provides the context in which those statements and expressions would be interpreted); and the two methods doNext and do Prev are as typed into the JSP. Typically, JSP-to-Java converters used in web servers tend to create even more complicated classes, which may contain other internal methods, fields, and possibly even inner classes that would also show up in the tree.

The presence of an item in the structure tree corresponds to its presence in the source code. Therefore, the structure presentation may be hyperlinked to the code in the editor window, such that clicking on the item in the tree transfers the cursor to the corresponding item in the code in the editor. In this example, the only items in the original JSP source code are the two methods doPrev and doNext. Everything else is removed—as shown in the structure tree under "Jsp declarations" in FIG. 1—because it is potentially confusing for the user, implementation-dependent, and irrelevant. Removing those items requires knowledge of the converter implementation. In the case of a JSP-to-Java converter, that would include the name of the class, the method that contains the Java statements and expressions (_jspservice if strictly following the JSP specification), and any extra items that are part of the generated class. Since a single file can contain more than one class, the class name is required to ensure that the main class, and not any converter-implementation-specific classes, is the one that is extracted; any other classes can be ignored. The tree node representing the main class name can then be discarded, as can the nodes for the jspservice method and any other extra items. The remaining tree nodes correspond to code typed in the JSP.

Those nodes are collected and placed under "Jsp declarations":

```
Jsp declarations:
    doNext( )
    doPrev( )
```

Since items may be removed, it is advantageous for the conversion to result in code that is as simple as possible, thus increasing efficiency in terms of speed and memory usage. The resulting code does not have to work in the full operating sense; it simply must be complete in its representation of the code typed in the original file (M). This point is salient when creating such a converter from scratch; but is also relevant if adapting an existing converter implementation (perhaps stripping out unused detail because the resulting generated code will not actually be executed).

Completion assistance is implemented by using existing completion engines E1, E2, E3, etc, for the individual constituent languages, and an input indicating the incomplete word and optionally preceding phrase(s) at the current cursor position. When completion assistance is invoked, the appropriate engine sends suggestions to the IDE which then displays the suggestions. Completion assistance may monitor the development of the code on an ongoing basis, providing suggestions as available. Alternatively, this feature may be controlled by direct request from the user, e.g., a designated function key.

Referring to FIG. 1, the cursor position at 17 follows the phrase PageContext.f. Having determined that the language is Java, the Java completion engine determines the various potential identifiers with respect to an instance of the PageContext class that might complete the partial phrase. The IDE then displays the list of relevant information, e.g., in window 13, the elements are listed in alphabetical order at B. Furthermore, since the first letter "f" is already provided by the user/programmer, an element starting with "f" is indicated with highlighting. In addition, the window 13 may include some descriptive information about the elements, such as the type of element, provided at C. The user/programmer may select any element in the suggestion window 13 to be inserted in the file M at the cursor position. Alternatively the user/programmer may continue entering the code, ignoring the suggestions.

Figure 6:
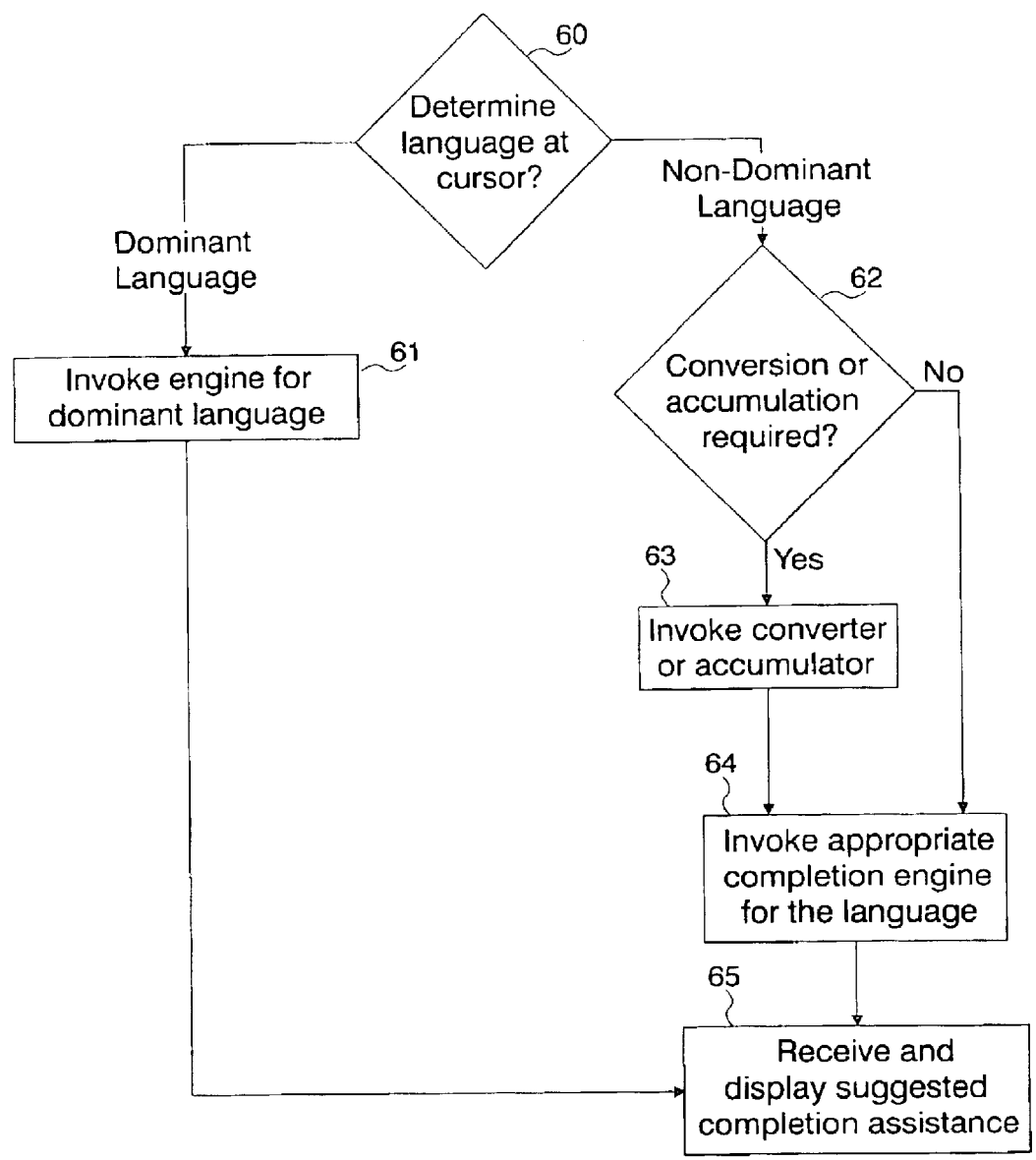
FIG. 6 is a flow chart showing the process of providing completion assistance according to an embodiment of the present invention.

Referring to FIG. 6, when completion assistance is invoked, at step 60, the IDE determines which language is being used at the location of the cursor. A simple way to achieve this is for all registered completion engines to be called, one after another, to report whether they can provide assistance. This could depend on the file type alone (e.g., the Java completion engine will always accept a .java file); or the file type and position, using existing (if possible) position mapping information (e.g., the Java completion engine checking a JSP file). Alternatively, determining the language may be based on the M-syntax markings nearest the cursor position, or based on a mapping which identifies the positions of code in each language as previously established by the implementation of another feature. If the partial phrase is in the dominant language, at step 61, the completion engine E1 for the dominant language is invoked. If the dominant language is not at the cursor, as determined at step 60, then a determination is made at step 62 as to whether conversion and/or accumulation is needed and not available from processing another feature. If so, the appropriate converter or accumulator is invoked and a buffer is created for corresponding code (steps 63). For example, where structure analysis and error reporting features are activated, some of the processing may be bypassed by sharing the buffers and/or files, for example, conversion or accumulation, code analysis, and mapping information. At step 64, the completion assistance engine for the current non-dominant language (E2, E3 etc.) is invoked to act on the code in the buffer having been converted or accumulated. The current position is passed to the completion assistance engine after it is translated from global (in M) to local (in the buffer) using the mapping information created by the accumulator or converter. If a converter is used and that converter uses some outside code that is available, the converter so informs the completion assistance engine of the location of that code. At step 65, the IDE receives the suggestions from the appropriate engine and displays the information indicating the first or best possible completion, if any.

In one embodiment, the completion engine E1 for the dominant language is modified to recognize M-syntax and M-language in order to provide completion assistance for M specific code as well as the dominant language. In another embodiment, the engines for each constituent language are enhanced to recognize the file type M. The engine(s) need not be further modified to enable delegating sections of code to other completion engines.

Since some languages use elements that may be defined or described in code in different files, some of these completion engines may have the option of accessing such supplementary code.

For example, an existing Java completion engine is registered with the IDE to declare that it can handle Java files. When completion assistance is invoked on a Java file, the IDE determines that the Java completion engine should be used, and such an engine is called. All completion engines must implement the same call mechanism, through which the IDE passes. At a minimum they require (1) some reference through which the engine can get the current contents of the file buffer, i.e. whatever the user has typed so far; and (2) some indication of the current position of the cursor, probably either row/column or simple character offset from the beginning of the buffer. With this information, the completion engine can determine the current cursor position in order to do its job. The completion engine may access other classes and source code in the current project, and any classes and source code in libraries used by the project. These classes may be required to provide accurate information (if the current Java file extends to another class) and, if available, the source code provides more detailed information, such as parameter names.

Continuing the example, several changes are required to use an existing Java completion engine with the IDE that handles JSP files. In particular, the registration of the Java engine with the IDE is changed so that JSP is a supported type; this may be achieved with a declarative, callback, or other means. The Java engine is also modified so that when it is invoked, it can determine whether it is being called for regular Java code or JSP code. When completion assistance is applied to JSP, instead of directly using the file buffer, the JSP-to-Java converter is invoked on the buffer to create the corresponding Java file in another buffer. Then the original JSP buffer is substituted with the new Java buffer (which may be a simple object reference assignment). During the JSP-to-Java conversion, the positions change; e.g. a period found at line 1, column 25 in the JSP can end up being at line 10, column 14 in the Java file. Those changes are logged in sufficient detail such that any given position in the JSP file is mapped to the corresponding position in the Java file. This mapped position is used instead of the original position. The resulting JSP-to-Java position inside a JSP-to-Java buffer corresponds to the original cursor position in the JSP buffer.

The JSP-to-Java conversion results in a Java file that uses a base class that is not actually part of the programmer/user's project. Each web server provides its own concrete implementation of a somewhat-loosely described class in the JSP specification. When working on JSP, the locations of the web server library that contains that base class and (optionally) its source code are inserted into the project's current path definitions. As a result, whether it is a JSP file or a regular Java file, a Java completion engine considers the Java code at the particular position in the buffer, with access to other Java classes and sources in the project and in libraries. Thus the bulk of the completion engine need not be modified.

The context-sensitive help feature is aided by the other development assistance features described above. The appropriate help information and/or documentation typically varies with the programming language. However the language for any section of code in M has previously been determined by at least the dominant parser if not other modules. The enhancement for features such as structural analysis and completion assistance already include identifying elements of code in the various languages. For example, if the user requests documentation regarding "table," the context sensitive help may first take note of the language of the section of code to which the user refers. For example, if the code section is HTML then table may be a tag, and if the code is Java then the table may be a field or particular type of variable. Context-sensitive help may also receive cues from the structure analysis and completion assistance as to what help information is most likely relevant to the situation. In this way the context sensitive help may maximize its efforts by using the information available from the other features, in selecting the help information and/or documentation to provide to the user. To implement this feature, the context-sensitive help is enhanced to incorporate M-syntax and to recognize M as a valid type.

Referring to FIGS. 1 and 2, at reference number 18, the statement of code is incomplete. If context-sensitive (CS) help is requested, the CS help module selects the most specific relevant information that can be determined based on the available code. In the example shown, based on the partial statement, the CS help module can determine that the statement involves the class PageContext. However, without additional information, the module cannot determine which method or field is relevant. Therefore, general information about the class PageContext is displayed as illustrated in window 20.

While the invention has been particularly shown and described with reference to preferred embodiments thereof, it will be understood by those skilled in the art that various changes in form and details may be made therein without departing from the spirit and scope of the invention.

What is claimed is:

1. A method for providing syntax indication of a code element in a mixed-language file, comprising the steps of:
   a. determining whether the code element in the mixed-language file is in a primary language;
   b. if the code element is determined to be of the primary language, identifying a syntax of the code element using a primary scanner;
   c. otherwise identifying the syntax of the code element using a supplemental scanner;
   d. applying generic style rules to the identified syntax of the code element; and
   e. generating the syntax indication for the code element in the mixed-language file in accordance with the applied generic style rules.

2. The method of claim 1 wherein the determining step comprises the steps of:
   a. identifying a marker in the mixed-language file associated with the code element;
   b. determining whether the code element is in the primary language or the supplemental language according to the associated marker.

3. The method of claim 1 further comprising the step of modifying the primary scanner to include the function of determining whether the code element is in the supplemental language.

4. The method of claim 1 wherein the determining step is performed using the primary scanner, the method further comprising the steps of:
   a. determining whether the code element is in the supplemental language using the primary scanner; and
   b. activating the supplemental scanner to identify the code element.

5. The method of claim 1 further comprises the steps of:
   a. modifying the primary scanner to recognize the supplemental language;
   b. modifying the supplemental scanner to recognize the primary language;
   c. when the primary scanner determines that the section of code is in the supplemental language, activating the supplemental scanner; and
   d. when the supplemental scanner determines that the section of code is in the primary language activating the primary scanner.

6. The method of claim 1, wherein the generating syntax indication further comprises the step of displaying the code element in at least one of a color, boldface, italic, and underlined, as determined by the applied generic style rules.

7. The method of claim 1 further comprising the steps of:
   a. modifying the primary scanner to recognize at least one supplementary language; and
   b. when the primary scanner determines that the section of the code is in at least one supplementary language, activating the supplementary scanner.

8. A method for providing syntax indication for a program containing code in a primary language and one or more supplementary languages, the method comprising the steps of:
   a. using a primary scanner to determine the language of a code element in the program;
   b. if the code element is in the primary language, determining the syntax of the code element using the primary scanner;
   c. if the code element is in one of the supplementary languages, invoking a supplementary scanner associated with the determined supplementary language; and determining the syntax of the code element using the invoked supplementary scanner; and
   d. generating the syntax indication for the code element in the program according to the determined syntax.

9. A method for providing structural representation for a mixed-language file comprising the steps of:
   a. identifying at least one section of the code as being in a primary language and at least one section of code as being in a supplemental language;
   b. parsing the section of code in the primary language using a primary parser generating code structure information;
   c. parsing the section of code in the supplemental language using a supplemental parser generating code structure information;

d. integrating the code structure information generated by the primary parser with the code structure information generated by the supplemental parser; and e. displaying the structural representation of the mixed-language file in a uniform format based on the integrated code structure information.

10. The method of claim 9 further comprising the steps of:

a. determining primary-language errors, if any, in the section of code in the primary language using the primary parser; and b. displaying a representation of the primary-language errors in the uniform format.

11. The method of claim 10 further comprising the step of integrating the display of the primary-language errors with the display of the structural representation of the mixed-language file.

12. The method of claim 11 further comprising the steps of:

a. associating each of the primary-language errors to a position in the section of code in the primary language in the mixed-language file where the primary-language errors occurred; and b. displaying a representation of the position associated with each of the primary-language errors in the uniform format.

13. The method of claim 9 further comprising the steps of:

a. determining supplemental-language errors, if any, in the section of code in the supplemental language using the supplemental parser; and b. displaying a representation of the supplemental-language errors in the uniform format.

14. The method of claim 13 further comprising the step of integrating the display of the supplemental-language errors with the display of the structural representation of the mixed-language file.

15. The method of claim 14 further comprising the steps of:

a. associating each of the supplemental-language errors to the position in the section of code in the supplemental language in the mixed-language file where the supplemental-language errors occurred; and b. displaying a representation of the position associated with each of the supplemental-language errors in the uniform format.

16. The method of claim 9 further comprising the steps of:

a. determining whether the section of code in the supplemental language is self-contained;

b. if the section of code is self-contained, accumulating the section of code in the supplemental language separate from the mixed-language file; and c. maintaining an association between the accumulated section of code and a position of the section of code in the supplemental language within the mixed-language file.

17. The method of claim 9 further comprising the steps of:

a. determining whether the section of code in the supplemental language is self-contained;

b. if the section of code is not self-contained, converting the section of code in the supplemental language into a converted section of code that is self-contained, using a supplemental converter; and c. maintaining an association between the converted section of code and a position of the section of code in the supplemental language within the mixed-language file.

18. The method of claim 9 further comprising the step of providing a link between the structural representation of the section code and the section of code in the mixed-language file wherein triggering the link toggles between the displayed structural representation and the displayed mixed-language file.

19. A method for providing structural representation for a mixed-language file comprising the steps of:

a. determining whether a section of code is in a primary language or a supplemental language;

b. for the section of code in the supplemental language; determining whether the supplemental language is designated for conversion;

c. for the section of code in the supplemental language that is designated for conversion; (i) converting the section of code using a converter generating a self-contained section of code and (ii) parsing the self-contained section of code using a first supplemental parser to generate the code structure information;

d. for the section of code in the supplemental language that is not designated for conversion; parsing the section of code using a second supplemental parser to generate the code structure information;

e. for the section of code in the primary language, parsing the section of code using a primary parser to generate code structure information;

f. integrating the code structure information from the primary parser, first supplemental parser and second supplemental parser into a common display; and g. displaying the structural representation of the mixed-language file in a uniform format based on the integrated code structure information.

20. The method of claim 19 further comprising the steps of:

a. mapping the code structure information generated by the primary parser to the section of code in the primary language in the mixed-language file;

b. mapping the code structure information generated by the first supplemental parser to the section of code in the supplemental language that is designated for conversion in the mixed-language file;

c. mapping the code structure information generated by the second supplemental parser to the section of code in the supplemental language that is not designated for conversion in the mixed language file; and d. combining the code structure information from the primary parser, first supplemental parser and second supplemental parser using the mapping for the mixed-language file.

21. The method of claim 19 further comprising the step of indicating in the structural representation any errors detected by the primary parser, the first supplemental parser or the second supplemental parser.

22. The method of claim 19 further comprising the step of a. identifying a marker in the mixed-language file associated with the section of code;

b. determining whether the section of code is self-contained according to the associated marker.

23. A method for providing context-sensitive help information for a mixed-language file, comprising the steps of:

a. receiving a request for help relating to a code element of the mixed-language file;

b. determining whether the code element is in a primary language or a supplementary language;

c. determining a context of the code element in accordance with the determined language;

d. if the section of code is in the primary language, selecting help information in accordance with the code element and the context of the code using a resource associated with the primary language; and e. if section of code is in the supplementary language, selecting help information in accordance with the code element and the context of the code using a resource associated with the supplementary language.

24. The method of claim 23 wherein the step of determining the context of the code further comprises the steps of a. referencing definition-type information contained in any portion of the mixed-language file; and b. determining the context of the code based on the referenced definition-type information.

25. A method for providing completion assistance for a mixed-language file, comprising the steps of:

a. determining the language at the position in the section of code where an entry is being made;

b. detecting a partial code element in the section of code;

c. selecting a completion engine associated with the determined language;

d. collecting one or more suggested code elements that satisfy the partial code element, using the selected completion engine; and e. displaying the one or more suggested code elements.

26. The method of claim 25, where in the further comprising the steps of:

a. referencing definition-type information contained in any portion of the mixed-language file; and b. determining the one or more suggested code elements in accordance with the referenced definition-type information.

27. The method of claim 26 further comprising the steps of:

receiving a selection from the one or more suggested code elements; and updating the partial code element to reflect the selection from the one or more suggested code elements.

28. A method for providing development assistance in an integrated development environment for a program file containing source code in more than one language, the method comprising the steps of:

a. scanning the source code to identify the language;

b. if the identified language is a primary language, determining a syntax of the source code in accordance with the primary language c. if the identified language is not the primary language, invoking a scanner designated for the identified language; and determining a syntax of the source code in accordance with the identified language using the scanner designated for the identified language;

d. applying generic style rule to determine a style-format for displaying the determined syntax; and e. displaying the source code in the style determined by the applied generic style-format rule.

29. The method of claim 28 further comprising the steps of:

a. if the identified language is the primary language, parsing the code to determine the structure of the code in accordance with the primary language using a parser designated for the primary language;

b. if the identified language is not the primary language, invoking a parser designated for the identified language and parsing the code to determine the structure of the code in accordance with the identified language using the parser designated for the identified language; and c. displaying a representation of the structure of the code as determined by the parser.

30. An integrated development system that provides assistance for program files containing code in a primary language and at least one supplemental language, the system comprising:

a. a primary scanner that provides syntax indication for the code in the file that is in the primary language; and b. at least one supplemental scanner that provides syntax indication for the code in the file that is in at least one supplemental language.

31. The system of claim 30 further comprising a text editor and user interface integrated with the primary scanner and the at least one supplemental scanner.

32. The system of claim 30 wherein the primary scanner further operates to invoke at least one supplementary scanner upon determination that the code is in at least one supplementary language.

33. The integrated development system of claim 30 further comprising:

a. a primary parser that provides a representation of the structure of the code in the file that is in the primary language; and b. at least one supplemental parser that provides the representation of the structure of the code in the file that is in at least supplemental language.

34. The integrated development system of claim 30 further comprising:

a. a context-sensitive help engine associated with the primary language; and b. a context-sensitive help engine associated with the supplementary language.

35. The integrated development system of claim 30 further comprising:

a. a completion assistance engine associated with the primary language and b. a completion assistance engine associated with supplementary language.

36. A computer readable medium encoded with processing instructions for implementing a method for providing development assistance in an integrated development environment for a program file containing source code in more than one language, the method comprising:

a. scanning the source code to identify the language;

b. if the identified language is a primary language, determining a syntax of the source code in accordance with the primary language c. if the identified language is not the primary language, invoking a scanner designated for the identified language; and determining the syntax of the source code in accordance with the identified language using the scanner designated for the identified language;

d. applying generic style rule to determine a style-format for displaying the determined syntax; and e. displaying the source code in the style-format determined by the applied generic style rule.

37. An apparatus for providing structural representation of a mixed-language file through a computer comprising a processor; and a memory in operative connection with the processor for storing processing instructions enabling the processor to:

a. identify at least one section of the code as being in a primary language and at least one section of code as being in a supplemental language;

b. parse the section of code in the primary language using a primary parser generating code structure information;

c. parse the section of code in the supplemental language using a supplemental parser generating code structure information;

d. integrate the code structure information generated by the primary parser with the code structure information generated by the supplemental parser; and e. display the structural representation of the mixed-language file in a uniform format based on the integrated code structure information.

38. A method for providing completion assistance for a mixed-language file, comprising the steps of:

a. determining the language at the position in the section of code where an entry is being made;

b. detecting a partial code element in the section of code;

c. selecting a completion engine associated with the determined language;

d. collecting one or more suggested code elements that satisfy the partial code element, using the selected completion engine; and e. displaying the one or more suggested code elements.

* * * * *